Patented Aug. 22, 1944

2,356,682

UNITED STATES PATENT OFFICE 2,356,682

CHEMICAL COMPOUNDS

William E. Messer, Cheshire, Conn., assignor to United States Rubber Company, New York, N. Y., a corporation of New Jersey No Drawing. Application April 30, 1942, Serial No. 441,211

2 Claims. (Cl. 260—306)

This invention relates to a new class of compounds which have been found valuable as accelerators for the vulcanization of rubber.

This case is a continuation-in-part of my co-pending applications Serial No. 280,929, filed June 24, 1939, Patent 2,321,305, and Serial No. 334,343, filed May 10, 1940, Patent 2,321,306.

The new class of compounds may be represented by the general formula R—O—X where R is an arylene-thiazyl sulfide group; O is oxygen; and X represents an R group.

These materials are derivatives of arylene-thiazyl sulfur chloride, wherein the chlorine is replaced by the O—X group above, when the arylene-thiazyl sulfur chloride is reacted with water. During such reaction hydrogen chloride is split off.

In the following illustrative examples, benzothiazyl sulfur chloride is used as the reagent; it may be prepared in solution, for purposes of reaction, by passing dry chlorine into a slurry of 1,1' dithio bisbenzothiazole in benzene, carbon tetrachloride, etc.

The following example is given to illustrate the invention in which comparison is made with a stock containing 1,1' dithio bis-benzothiazole (parts are by weight):

Example

To a mixture of 20 grams 1,1' dithio bis-benzothiazole and 100 ccs. of carbon tetrachloride was added the theoretical amount of chlorine and this product added to 400 ccs. water, slowly, with strong agitation. Stirred for 2 hours more while heating to drive off solvent which may be condensed and recovered. Finally cooled with stirring and filtered off precipitate, washed and dried. Fifteen grams of a nearly white product are obtained having a melting range of 161–169° C. The percent nitrogen was 8.14% (theory is 8.05% nitrogen).

The structure is believed to be:

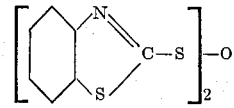

Having thus described my invention, what I claim and desire to protect by Letters Patent is:

1. A compound having the formula R—O—X where R is an arylene-thiazyl sulfide group; O is oxygen directly linked to thiol sulfur of the sulfide group; and X represents an R group.

2. A compound having the general formula

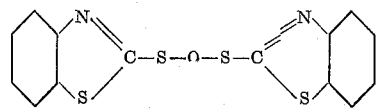

WILLIAM E. MESSER.